United States Patent
Hughes et al.

(10) Patent No.: US 6,888,273 B2
(45) Date of Patent: May 3, 2005

(54) INTEGRATED MOTOR AND CLUTCH ASSEMBLY

(75) Inventors: Douglas A. Hughes, Wixom, MI (US); James K. Spring, Brighton, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/285,234

(22) Filed: Oct. 31, 2002

(65) Prior Publication Data

US 2004/0084979 A1 May 6, 2004

(51) Int. Cl.⁷ .............................................. H02K 7/00
(52) U.S. Cl. ............................ 310/78; 310/92; 310/87; 310/93; 310/112; 310/113; 310/114; 180/65.1; 180/65.8
(58) Field of Search ........................... 310/78, 92, 374, 310/83, 112, 113, 114, 87; 180/347, 65.1, 56.2, 65.8

(56) References Cited

U.S. PATENT DOCUMENTS

| | | | | |
|---|---|---|---|---|
| 4,564,775 A | * | 1/1986 | Mazzorana ................. | 310/62 |
| 4,701,653 A | * | 10/1987 | Merkle ....................... | 310/152 |
| 5,562,565 A | | 10/1996 | Moroto et al. ............... | 477/3 |
| 5,773,904 A | * | 6/1998 | Schiebold ................... | 310/92 |
| 5,915,513 A | * | 6/1999 | Isley ........................... | 192/35 |
| 6,184,603 B1 | * | 2/2001 | Hamai et al. ................ | 310/75 |
| 6,208,036 B1 | | 3/2001 | Evans et al. ................ | 290/46 |
| 6,308,794 B1 | | 10/2001 | Oppitz ........................ | 180/65.2 |
| 6,347,929 B1 | * | 2/2002 | Cooper ....................... | 417/423.7 |
| 6,481,548 B2 | * | 11/2002 | Monahan ..................... | 192/38 |
| 6,561,332 B2 | | 5/2003 | Organek et al. | |
| 6,666,315 B2 | * | 12/2003 | Organek ..................... | 192/84 |

FOREIGN PATENT DOCUMENTS

| | | |
|---|---|---|
| DE | 100 32 906 A1 | 3/2001 |
| EP | 0 493 840 A2 | 7/1992 |
| WO | WO-01/72546 A1 | 10/2001 |
| WO | WO-02/25133 A1 | 3/2002 |

OTHER PUBLICATIONS

International Search Report (4 pages).
Delphion English Abstract for DE 100 32 904 A1 (6 pages).
Delphion English Abstract for EP 0 493 840 A2 (7 pages).

\* cited by examiner

*Primary Examiner*—Darren Schuberg
*Assistant Examiner*—Iraj A. Mohandei
(74) *Attorney, Agent, or Firm*—Rader, Fishman & Grauer PLLC (57) ABSTRACT

An integrated motor and clutch assembly is provided, which includes a housing that rotatably supports an input shaft and an output shaft. A selectively engageable friction clutch is disposed between the input shaft and the output shaft for transferring torque therebetween. The friction clutch includes an outer hub connected for rotation with the output shaft. The integrated motor and clutch assembly also includes a motor having a rotor non-rotatably connected to the outer hub of the friction clutch and disposed coaxial with the input and output shafts. The motor also includes a stator secured to the housing and disposed concentric with the rotor.

21 Claims, 6 Drawing Sheets

INTEGRATED MOTOR AND CLUTCH ASSEMBLY

BACKGROUND OF THE INVENTION

1. Field of the Invention

The present invention relates generally to a clutch and motor/generator arrangement suitable for use in a hybrid powertrain and more particularly to an integrated clutch and motor/generator assembly.

2. Description of the Related Art

Hybrid vehicle powertrain systems employing two or more prime movers to drive the vehicle are well known in the art. Typical hybrid powertrain systems utilize an internal combustion engine that is strategically operated in combination with an electric motor to provide driving torque to the wheels of the vehicle.

So-called "parallel hybrid" powertrain systems have been developed that commonly interface the electric motor in line between the vehicle engine and the transmission. In one known parallel hybrid system, the motor rotor is coupled directly to the engine output shaft. In this type of parallel hybrid powertrain, a main clutch must be operated conventionally to disengage the engine from the transmission. Such use of a separate main clutch and motor requires significant space between the engine and the transmission to accommodate the width of the components. This limitation increases the overall size and weight of the hybrid powertrain, which is undesirable to manufacturers of hybrid vehicles.

SUMMARY OF THE INVENTION

The present invention provides an integrated motor and clutch assembly, which includes a housing that rotatably supports an input shaft and an output shaft. A selectively engageable clutch is disposed between the input shaft and the output shaft for transferring torque therebetween. The clutch includes an outer hub connected for rotation with the output shaft. The integrated motor and clutch assembly also includes a motor having a rotor non-rotatably connected to the outer hub of the clutch and disposed coaxial with the input and output shafts. The motor also includes a stator secured to the housing and disposed concentric with the rotor. The motor is operable to generate torque to drive rotation of the output shaft in complement to or independent of the torque provided by the input shaft through the clutch.

In an embodiment of the present invention, the selectively operable clutch includes a ball ramp mechanism for generating a clamping force. The ball ramp mechanism includes an annular control plate having a plurality of circumferential control ramps formed in a face of the control plate, which vary in axial depth. The ball ramp mechanism also includes an equivalent number of rolling elements, one occupying each of the control ramps, and an activation plate mounted to the output shaft through a first one-way clutch having an axis of rotation coaxial with the axis of rotation of the control plate. The activation plate includes a plurality of activation ramps substantially identical in number, shape and radial position to the control ramps. The activation ramps at least partially oppose the control ramps and each of the rolling elements is contained between one of the activation ramps and a respective control ramp. The control plate is axially and rotationally moveably disposed relative to the activation plate and includes an annular control extension radially extending therefrom. The activation plate also includes an annular activation extension radially extending therefrom. An annular intermediate plate is non-rotatably connected to the output shaft and disposed between the control extension and the activation extension.

In the same embodiment of the invention, the clutch also includes a coil for creating an electromagnetic field in a coil armature upon introduction of an electrical current in the coil. The coil armature is mounted to the input shaft through a second one-way clutch. A clutch pack is also provided in the clutch for frictionally rotatably connecting the input shaft to the output shaft upon application of the clamp load generated by the ball ramp mechanism. Upon introduction of an electrical current in the coil, an electromagnetic field is generated to rotationally couple the coil armature to the control extension. Additionally, the electromagnetic field couples the control extension to the intermediate plate and the intermediate plate to the activation extension.

Various additional aspects of this invention will become apparent to those skilled in the art from the following detailed description of the preferred embodiment, when read in light of the accompanying drawings.

DESCRIPTION OF THE PREFERRED EMBODIMENTS

Certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Although primarily described for use in a vehicle powertrain, particularly a hybrid powertrain, the present invention can be used to rotationally correct any two rotatable shafts in response to one or more control signals. Such alternative devices could include, but are not limited to, differentials, engine retarders, transmission brakes, foundation brakes, inertia brakes, transfer cases and other devices. Additionally, the present invention can be used to supplement the power transmitted between any two rotatable shafts, or to transmit power through one rotatable shaft independent of the other.

Figure 1:
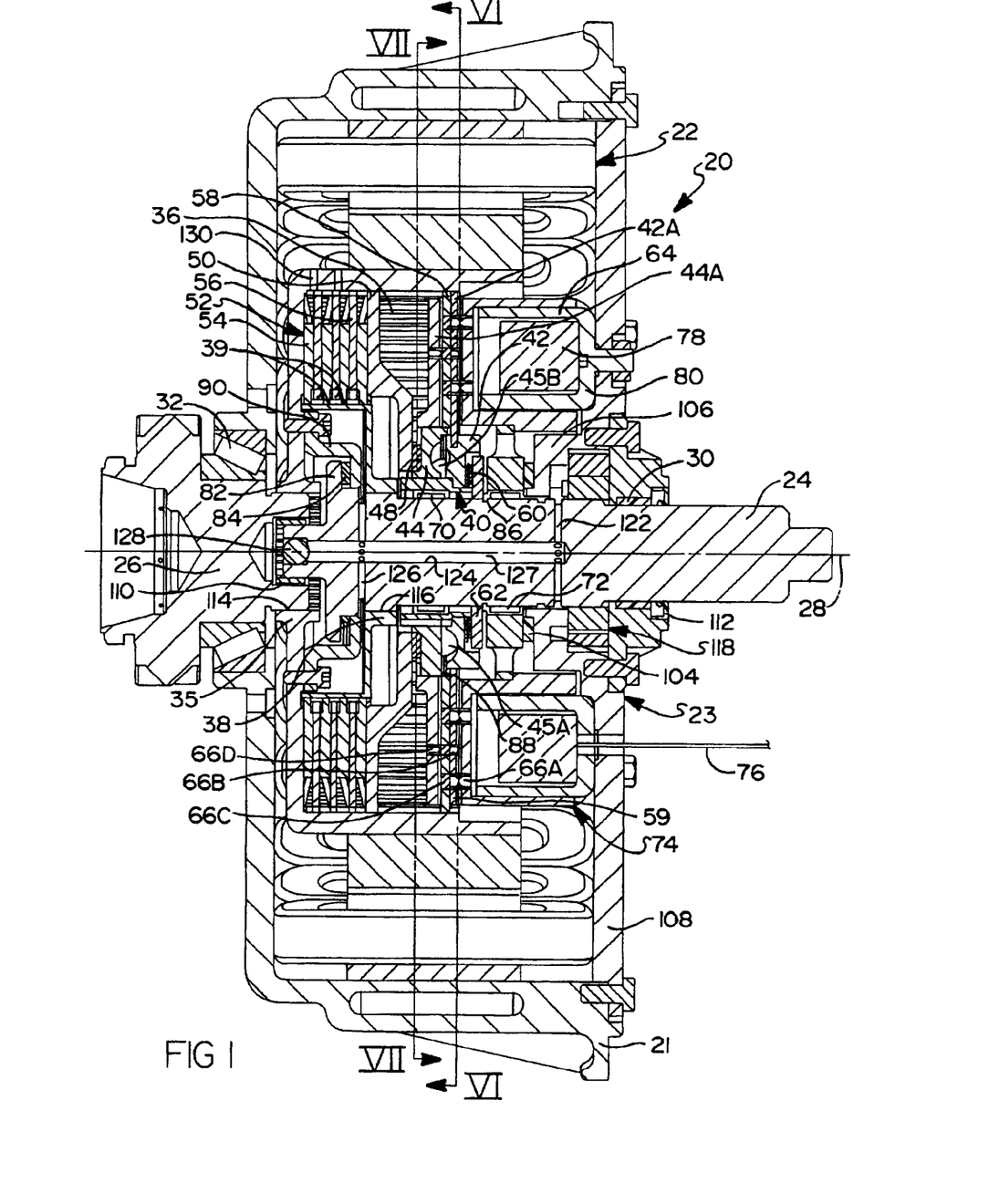
FIG. 1 is a cross-sectional view of the integrated motor and clutch assembly of the present invention.

Referring now to FIG. 1, a cross-sectional view of an integrated motor and clutch assembly 20 according to the present invention is shown. Integrated motor and clutch assembly 20 (hereinafter referred to as assembly 20) includes a housing 21 within which the motor 22 and clutch 23 portions of assembly 20 are contained. The term "motor" as used herein includes any device used to convert electrical energy into a mechanical input, as well as those devices that can also convert a mechanical input into electrical energy.

Assembly 20 includes an input shaft 24 that is connected to a source of rotative power, such as an internal combustion engine (not shown). The clutch portion 23 of assembly 20 functions to rotationally link the input shaft 24 to an output shaft 26, which, for example, could be the input shaft to a transmission.

Input shaft 24, for purposes of describing the embodiment illustrated in FIG. 1, is shown on the right side of assembly 20. The elements of assembly 20 generally rotate and are symmetrical around an axis of rotation 28. Input shaft 24 is rotatably supported within housing 21 by a first bearing 30 and output shaft 26 is rotatably supported by a second bearing 32. Output shaft 26 is attached to a clutch outer hub 35, which has a plurality of splines 36 on an inner surface thereof. Input shaft 24 is attached to a clutch inner hub 38, which has a plurality of splines 39 formed on an outside peripheral surface thereof. It will be appreciated that the connotation of the terms "input shaft" and "output shaft" are interchangeable depending on the direction of torque flow through assembly 20.

Clutch portion 23 of assembly 20 also includes a ball ramp mechanism 40 having a control plate 42, an activation plate 44 and a plurality of rolling elements 45A, 45B, 45C (see FIG. 3), which separate control plate 42 and activation plate 44 depending on their relative position in respective ramps 46A, 46B, 46C and 47A, 47B, 47C. As activation plate 44 moves away from control plate 42, it acts through a thrust bearing 48 to apply a force on a pressure plate 50 so as to compress a clutch pack 52 to provide a frictional rotational link between clutch inner hub 38 and outer hub 35. Clutch pack 52 includes a plurality of drive plates 54, which are nonrotatably connected to inner hub 38 by splines 39 and a plurality of driven plates 56, which are nonrotatably connected to outer hub 35 by splines 36. By using splines 36, pressure plate 50 is nonrotationally coupled so as to rotate with clutch outer hub 35, but free to move axially as required.

Again, the connotation of the terms "driven plates" and "drive plates" depends on the direction of torque flow through the driveline. For example, if an engine is powering the vehicle through input shaft 24, then the connotation of the terminology is traditional, whereas when the vehicle is being braked by the engine, then the connotation must be reversed.

Figure 6:
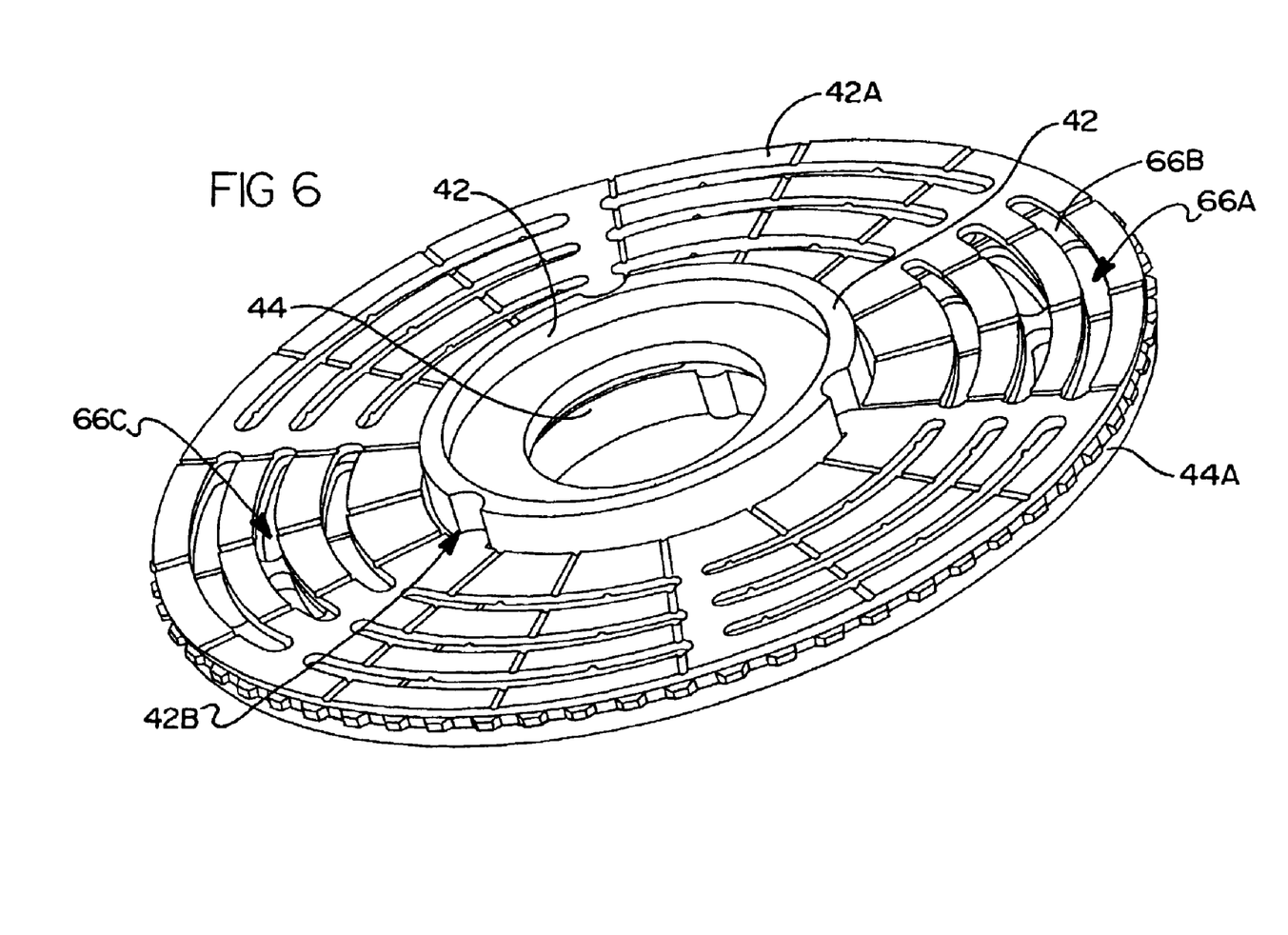
FIG. 6 is a perspective view of a portion of the integrated motor and clutch assembly of FIG. 1 taken along line VI—VI.
Figure 7:
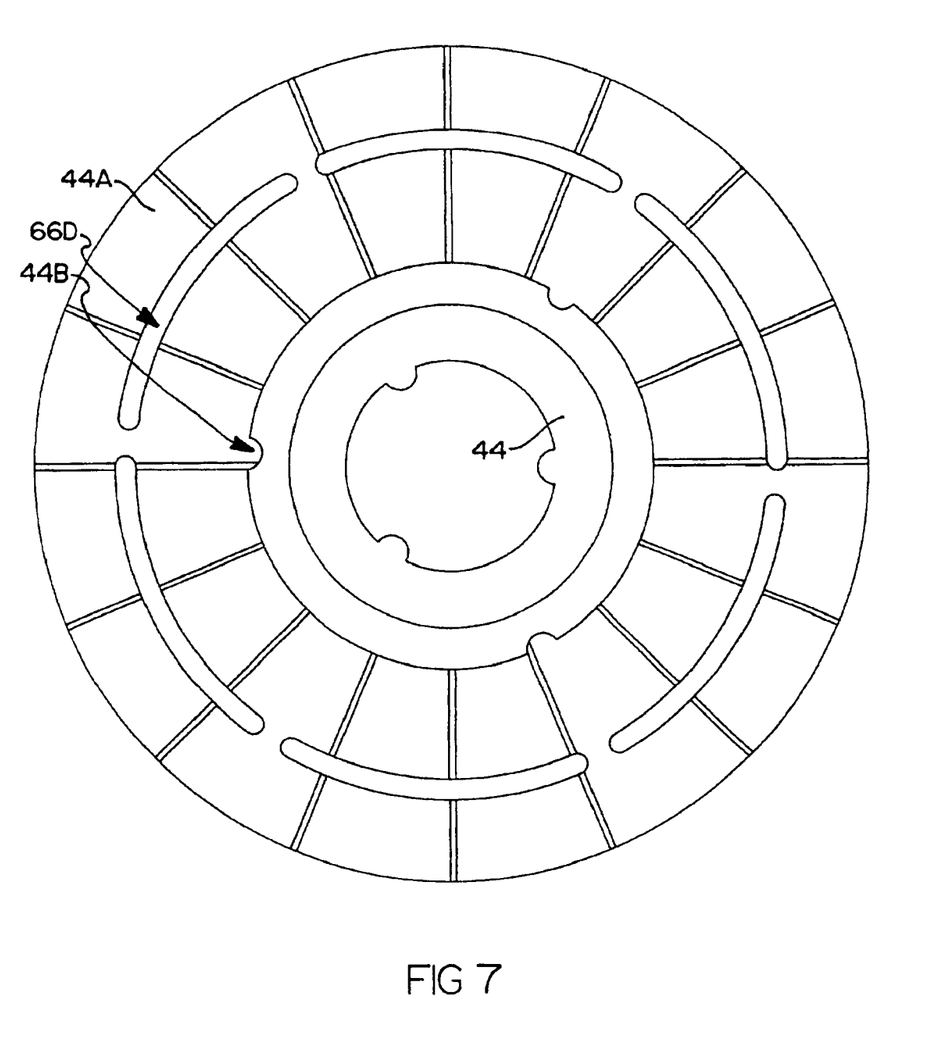
FIG. 7 is an elevated view of a portion of the integrated motor and clutch assembly of FIG. 1 taken along line VII—VII.

An intermediate plate 58 is connected to clutch outer hub 35 through splines 36. By using splines 36, intermediate plate 58 is non-rotatably coupled so as to rotate with clutch outer hub 35, but free to move axially as required. Intermediate plate 58 is axially positioned between a control extension 42A and an activation extension 44A. Control extension 42A is coupled to control plate 42 with a control slip joint 42B (see FIG. 6) and activation extension 44A is coupled to activation plate 44 with an activation slip joint 44B (see FIG. 7). Slip joints 42B and 44B of the control extension 42A and the activation extension 44A, respectively, allow control plate 42 and activation plate 44 to move while control extension 42A, intermediate plate 58 and activation extension 44A remain in contact. Control plate 42 is axially restrained by a thrust bearing 60, which reacts against a shaft flange 62 attached to input shaft 24.

More specifically, during engagement of clutch 23, control extension 42A magnetically interacts with both a coil armature 64 and intermediate plate 58. Activation extension 44A magnetically and frictionally interacts with intermediate plate 58. Control extension 42A, intermediate plate 58 and activation extension 44A contact one another directly or a friction material can be attached to either or both of the surfaces of control extension 42A, intermediate plate 58 or activation extension 44A. A plurality of circumferentially extending regions of low magnetic permeability 66A, 66B, 66C and 66D, such as a non-magnetic material or a slot, are formed in coil armature 64, intermediate plate 58, control extension 42A, and activation extension 44A, respectively, to provide a proper magnetic circuit. As shown in FIG. 1, the regions of low magnetic permeability are in substantial axial alignment at a specific rotational position.

A first one-way clutch 70 is used to support the activation plate 44 on input shaft 24. First one-way clutch 70 is oriented to lock the rotation of activation plate 44 when input shaft 24 is rotating and transferring torque in a particular direction, such as when the engine is powering the vehicle and the driveline torque is flowing from input shaft 24 to drive output shaft 26.

A second one-way clutch 72 is used to support coil armature 64 on input shaft 24. Second one-way clutch 72 is oriented opposite to first one-way clutch 70 to lock the rotation of control plate 42 when input shaft 24 is rotating in a direction such as when the engine is braking the vehicle and the torque flow through the driveline is reversed from the direction described above.

A coil assembly 74 is electrically energized by a control unit (not shown) through signal wires 76 to produce an electromagnetic field to activate ball ramp mechanism 40. Coil assembly 74 includes a coil 78 that is mounted to housing 21 and a coil stator 80 that is partially surrounded by coil armature 64. Both coil stator 80 and coil armature 64 are made of a ferromagnetic material to allow conduction of electromagnetic fields therein.

When coil assembly 74 is energized, control plate 42 through control extension 42A, intermediate plate 58, and activation plate 44 through activation extension 44A, are electromagnetically drawn together to become frictionally and rotationally linked. Some slippage may occur depending on the axial loading, the coefficient of friction of the material and the torque transfered. This configuration, in combination with the operation of first and second one-way clutches 70 and 72, results in a ball ramp mechanism 40 that will remain engaged, even if the direction of torque transfer is reversed.

Figure 3:
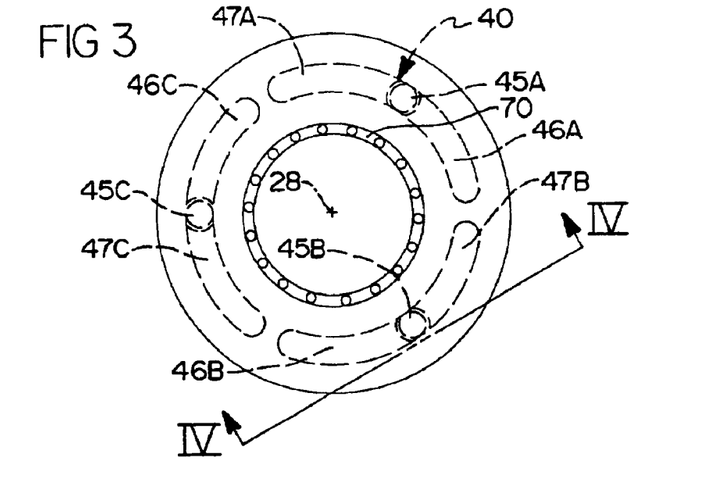
FIG. 3 is an elevated view of an activation plate viewed in a direction facing a control plate and showing a plurality of rolling elements between the activation and control ramps thereof.
Figure 4:
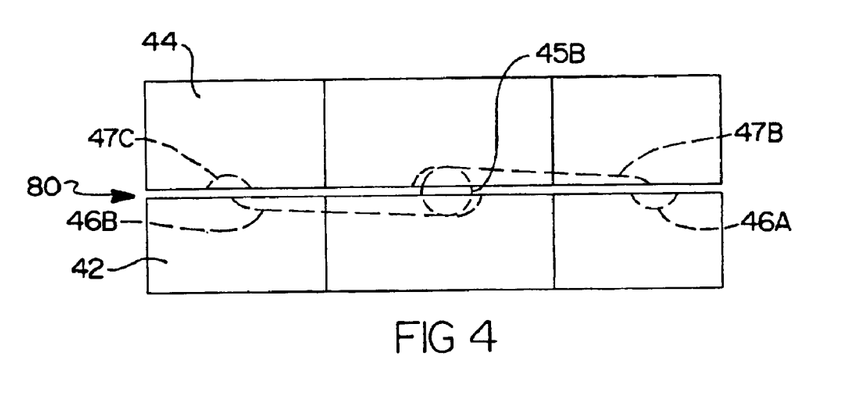
FIG. 4 is an illustrative partial view of a ball ramp mechanism of the integrated motor and clutch assembly taken along line IV—IV of FIG. 3, showing the ball ramp mechanism in the non-activated position.
Figure 5:
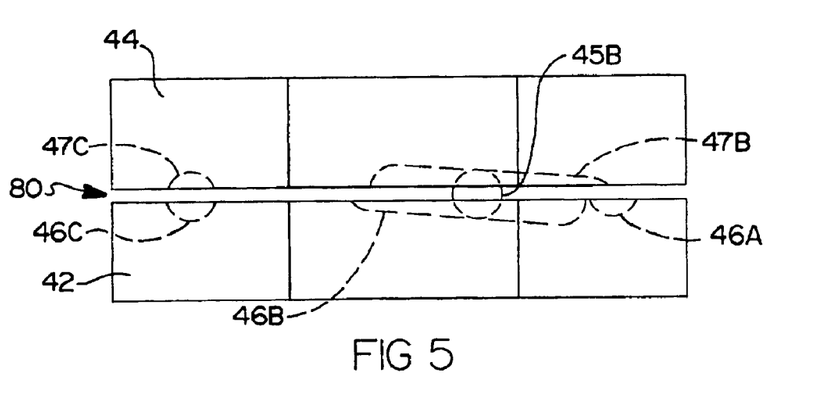
FIG. 5 is an illustrative partial view of the activated ball ramp mechanism taken along line IV—IV of FIG. 3, showing the ball ramp mechanism in the activated position.

More clearly illustrated in FIG. 3 are the control ramps 46A, 46B, 46C formed in control plate 42 and activation ramps 47A, 47B, 47C formed in activation plate 44. Control ramps 46A, 46B, 46C at least partially oppose activation ramps 47A, 47B, 47C and both are of variable depth increasing from one end to the other. Rolling elements 45A, 45B, 45C simultaneously contact and roll along respective opposed control ramps 46A, 46B, 46C and activation ramps 47A, 47B, 47C. Rolling elements 45A, 45B, 45C are shown in FIG. 4 in a non-activated position, each rolling element 45A, 45B, 45C contacting a respective control and activation ramp 46A, 46B, 46C; 47A, 47B, 47C at their lowest depth to minimize the separation distance 80. As ball ramp mechanism 40 is activated by electrically energizing coil 78, assuming there exists slippage in the clutch pack 52, control plate 42 moves counterclockwise relative to activation plate 44, causing rolling elements 45A, 45B, 45C to traverse the three respective pairs of opposed variable depth control ramps 46A, 46B, 46C and activation ramps 47A, 47B, 47C. As control plate 42 continues to rotate relative to the activation plate 44, separation distance 80 increases to augment the clamp force on clutch pack 52, as shown in FIG. 5.

Again referring to FIG. 1 of the drawings, and as described above, output shaft 26 is non-rotatably connected to clutch outer hub 35, which includes splines 36 extending from the inner surface thereof to nonrotatably engage the driven plates 56. Clutch inner hub 38 is non-rotatably attached to input shaft 24 and generally rotates relative to clutch outer hub 35 unless clutch 23 is fully engaged without slippage. Splines 36 extend to nonrotatably engage intermediate plate 58 and pressure plate 50. Drive plates 54, which are non-rotatably connected to inner hub 38, are frictionally and rotationally coupled to driven plates 56 when ball ramp mechanism 40 is energized by electrically energizing coil 78. When coil 78 is electrically energized, an electromagnetic field is generated, which flows through stator 80 and armature 64. Stator 80 and coil 78 are mounted to housing 21.

The embodiment shown in FIG. 1 does not load housing 21 since the clutch clamping force is contained between a flange 82 on input shaft 24 and thrust bearing 84 acting on flange 82, and on the opposite side of clutch pack 52, by thrust bearing 60 acting against shaft flange 62. Shaft flange 62 is axially supported on input shaft 24 by a retaining ring 86.

Activation extension 44A is linked to control plate 42 using a flange 88 on activation plate 44 so that the two elements can freely move rotationally, but are limited in their relative axial separation. Flange 88 functions to limit the separation between activation extension 44A, intermediate plate 58 and control extension 42A so that these elements do not abruptly engage ball ramp mechanism 40 when coil assembly 74 is electrically energized. Flange 88 allows activation plate 44 to move axially when one-way clutch 70 is locked relative to input shaft 24.

Roller thrust bearing 48 separates activation plate 44 and pressure plate 50, which allows both activation plate 44 and pressure plate 50 to rotate independently. Pressure plate 50 axially loads clutch pack 52 when ball ramp mechanism 40 is energized. Clutch pack 52 pushes against clutch outer hub 35, which is retained by a coupling 90 to translate the axial force to thrust bearing 84 and onto flange 82. In this manner, the entire clamping load of clutch pack 52 is contained and not transferred to housing 21. A thrust bearing 104 is placed between armature 64 and a pump cover portion 106 of a front cover 108, which serves to provide axial support to armature 64. Front cover 108 is connected to housing 21.

Transmission front bearing 30 and rear bearing 32 basically support the clutch 23 within housing 21. A support bearing 110 contacts output shaft 26 and input shaft 24 further providing support to clutch 23 while permitting relative rotation between input shaft 24 and output shaft 26. A Seal 112 prevents the leakage of oil from the housing 21.

A plurality of splines 114 function to nonrotatably link clutch outer hub 35 to output shaft 26 to facilitate the assembly of the clutch components. A plurality of splines 116 are also used to non-rotatably couple input shaft 24 to clutch inner hub 38. Splines 114 and splines 116 combine to provide a torque path from input shaft 24 through clutch pack 52 and into output shaft 26. Thus, the normal driving torque flow through clutch 23 when coil assembly 74 is electrically powered and ball ramp mechanism 40 is energized, is from input shaft 24 through splines 116, to clutch inner hub 38 into clutch pack 52, and then into clutch outer hub 35 and through splines 114, and into output shaft 26. The torque flow through clutch 23 is reversed when the power train operates in a driven mode where essentially input shaft 24 acts as an output shaft and the output shaft 26 acts as an input shaft.

Assembly 20 also includes an oil pump 118, in the form of a gerotor pump, which functions to provide a pressurized flow of oil through rotating clutch pack 52, ball ramp mechanism 40 and motor 22 to provide both a source of cooling and lubrication. Oil pump 118 includes at least one port 120 (FIG. 2), which is connected to an oil return line (not shown) that supplies a flow of oil from a heat exchanger (not shown). The oil is then drained through a separate oil sump line (not shown). The oil flows to the clutch through an oil supply aperture 122 and flows into an inner cavity 124 of input shaft 24 for distribution to clutch pack 52 and ball ramp mechanism 40 through various oil apertures 126 and 127, respectively. A plug 128 is used to contain the flow of cooling/lubricating oil that is force fed by pump 118 through shaft cavity 124 from an external oil supply to the clutch. The flow of oil exits clutch 23 through a series of apertures 130 in clutch outer hub 35 into motor 22.

Figure 2:
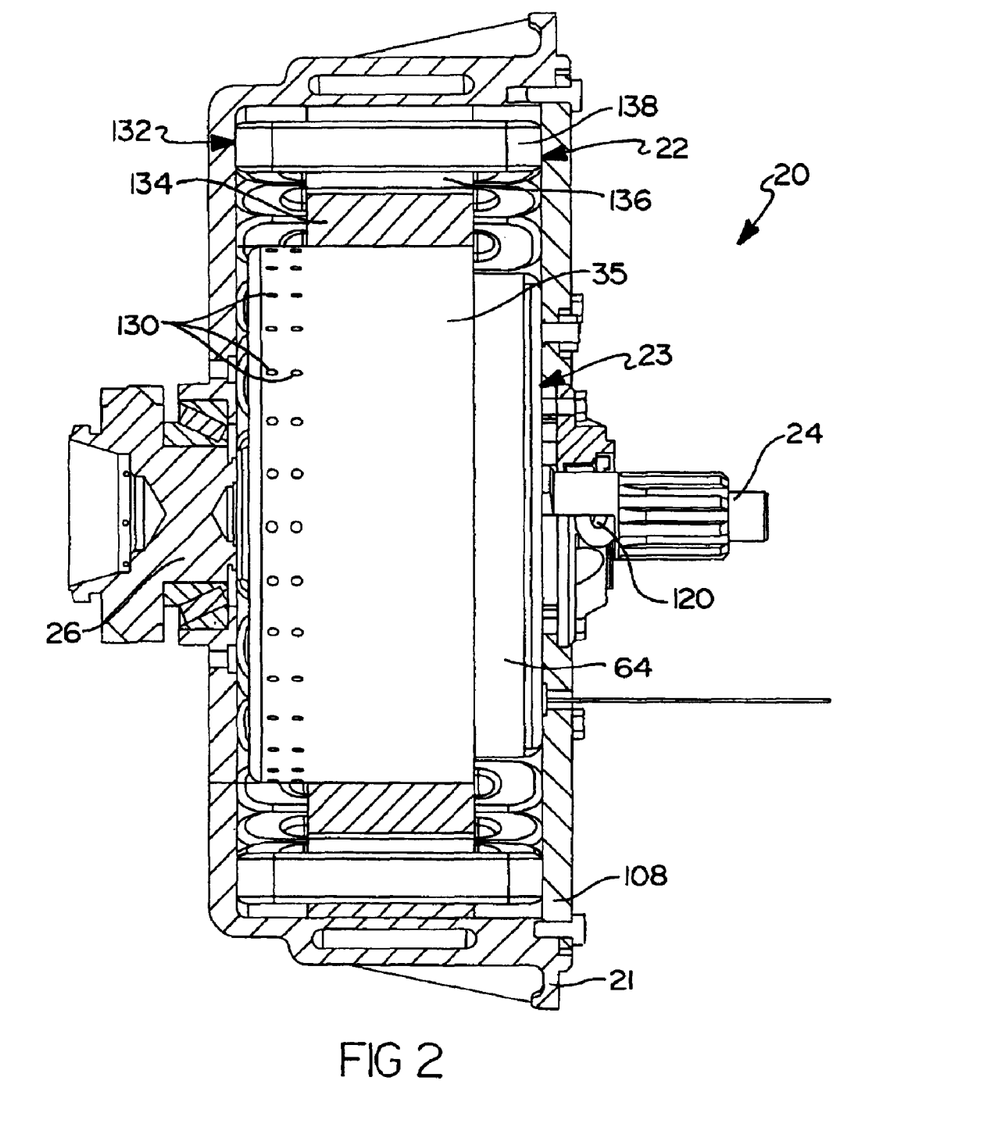
FIG. 2 is a partial cross-sectional view of the integrated motor and clutch assembly of FIG. 1.
Figure 8:
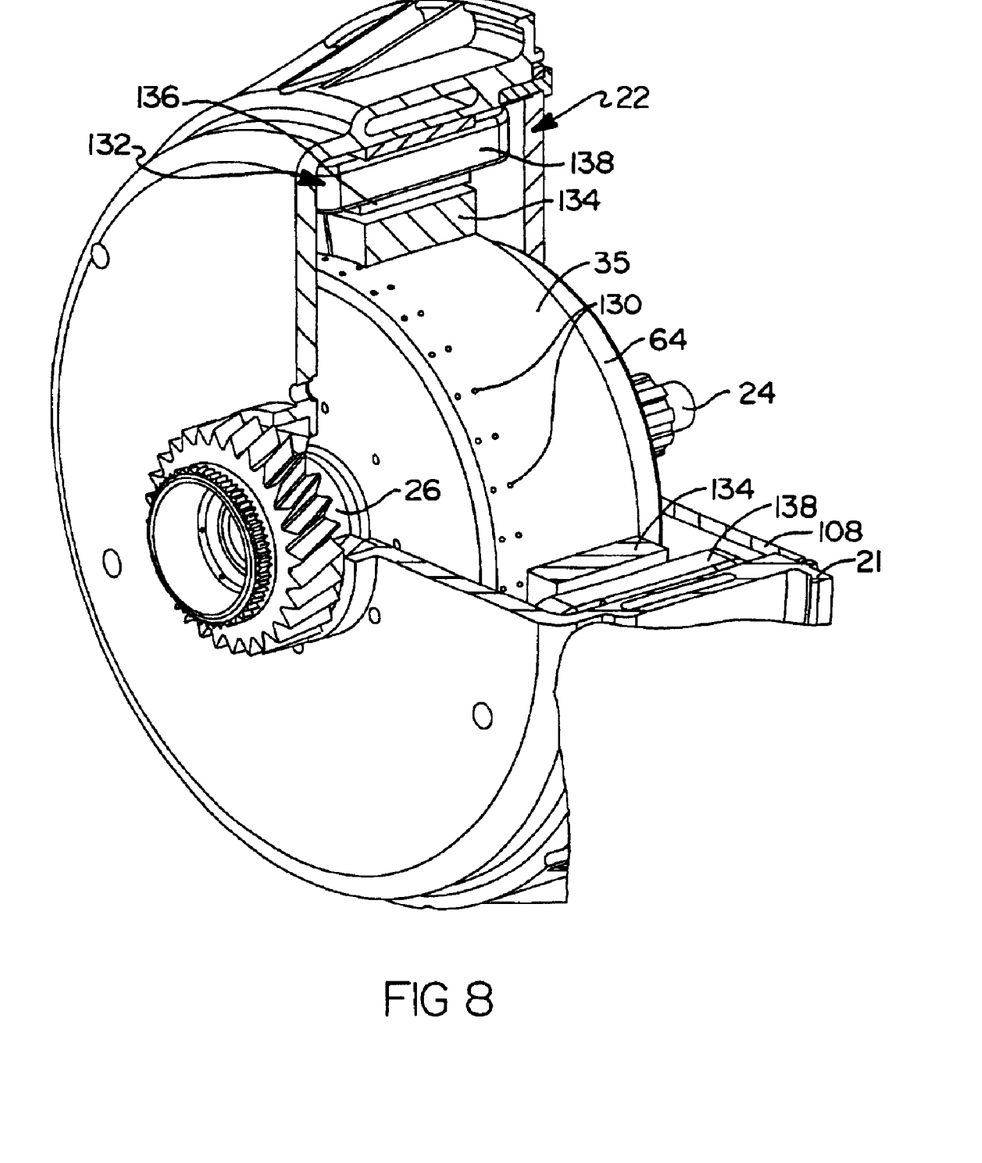
FIG. 8 is a sectioned perspective view of the clutch assembly of FIG. 1.

Referring to FIGS. 2 and 8, a partial cross sectional view and a sectional view, respectively, of assembly 20 are shown. In FIG. 2, a plan view of clutch outer hub 35 is shown, whereas the motor portion 22 of assembly 20 and output shaft 26 are shown in cross section. Motor 22 includes a stator 132 and a rotor 134. Stator 132 is secured to housing 21 and rotor 134 is secured to clutch outer hub 35. Stator 132 includes a plurality of poles 136 that are attached to housing 21 circumferentially around rotor 134. Poles 136 are surrounded by an electrically conductive winding 138. Rotor 134 includes a plurality of sections, each having a known magnetic property. The sections of rotor 134 are non-rotatably coupled to clutch outer hub 35 for rotation therewith.

Motor 22 is capable of producing electrical energy from a given mechanical input, and converting an electrical energy into mechanical output. The same or similar control unit used to control clutch 23 is employed to control operation of motor 22. The control unit can be programmed to control operation of motor 22 to generate electrical energy for storage in an electrical storage device (not illustrated), such as a battery or bank of batteries. Control unit can also be programmed to drive rotation of clutch outer hub 35 to provide a drive torque to output shaft 26 and input shaft 24 through clutch 23.

Operation

To illustrate operation of assembly 20, first consider the situation when the torque flow is from input shaft 24 to output shaft 26 when both the input and output shafts 24, 26 are both rotating clockwise as viewed from input shaft 24, coil assembly 74 is energized and motor 22 is not operating. This condition is analogous to a vehicle being powered by the engine where the clutch is functioning as a master clutch.

In this situation, first one-way clutch 70 becomes locked and second one-way clutch 72 becomes unlocked to allow relative rotation between control plate 42 and activation plate 44 in a direction to expand ball ramp mechanism 40. Control plate 42 is frictionally connected to coil armature 64 through control extension 42A, which is allowed to rotate at or slower than the speed of output shaft 26 by second one-way clutch 72 that is unlocked (i.e. the input shaft 24 and output shaft 26 are rotating clockwise while coil armature 64 is free to rotate relative to input shaft 24 in a counterclockwise direction). Thus, coil armature 64 can rotate at or slower than the speed of output shaft 26.

Intermediate plate 58 is rotating with output shaft 26 while activation plate 44 is locked by first one-way clutch 70 to rotate with input shaft 24. If there is slippage occurring in clutch pack 52, then input shaft 24 will be rotating at a slightly higher speed than output shaft 26. Thus, intermediate plate 58 will be rotating with output shaft 26, but control plate 42 cannot rotate faster than output shaft 26 because it is magnetically/frictionally coupled to coil armature 64 through control extension 42A, which is only allowed to rotate at the speed of output shaft 26 or slower. Intermediate plate 58 is also frictionally coupled to activation plate 44 through activation extension 44A, which is allowed to rotate at or faster than output shaft 26 because first one-way clutch 70 is locked. Thus, if there is slippage in clutch pack 52, then input shaft 24 is rotating faster than output shaft 26 and activation plate 44 will rotate faster than control plate 42 (at least for a short time), which will further activate ball ramp mechanism 40 and increase the separation distance 80 between control plate 42 and activation plate 44. The increased separation will increase the clamp load on clutch pack 52 by axial movement of pressure plate 50. This will in turn reduce the amount of slippage in clutch pack 52 and improve rotational coupling between input shaft 24 and output shaft 26.

Now consider the situation when the torque flow is reversed from the preceding example and output shaft 26 is attempting to rotate faster than input shaft 24. When the clutch is functioning as a master clutch, this situation is analogous to a vehicle which is under engine braking. Both input shaft 24 and output shaft 26 are still rotating clockwise and coil assembly 74 is energized. First one-way clutch 70 becomes unlocked and second one-way clutch 72 becomes locked to allow relative rotation between control plate 42 and the activation plate 44 to further expand ball ramp mechanism 40. When coil 78 is electrically energized, control plate 42 is frictionally connected to the coil armature 64 through control extension 42A, which is rotationally connected to output shaft 26 by the locked second one-way clutch 72. Thus, coil armature 64 and control plate 42 will rotate at least as fast as output shaft 26. Since activation extension 44A is magnetically attracted toward intermediate plate 58, activation plate 44 will be frictionally slowed to the speed of input shaft 24. This is permitted since first one-way clutch 70 is unlocked, which allows activation plate 44 to rotate at a slower speed than output shaft 26. In this manner, the present invention provides for the rotation of activation plate 44 relative to control plate 42 in the same direction as the previous example which results in an increase in the axial separation distance 80 between control plate 42 and activation plate 44, and a corresponding increase in the clamping load on clutch pack 52.

Thus, the clutch portion of the present invention provides for an increase in clutch pack 52 clamp load when the torque is flowing in either direction through the clutch using ball ramp mechanism 40. The utilization of first one-way clutch 70 on activation plate 44 and second one-way clutch 72 on coil armature 64 provides the operational feature of continuous loading of clutch pack 52 in any type of operational mode when coil 78 is energized. The use of intermediate plate 58 increases the stability of ball ramp mechanism 40 and in turn, improves the controllability of the clutch.

Another situation to consider is when motor 22 is providing torque to drive rotation of clutch outer hub 35. In one mode of operation, motor 22 is operated while clutch 23 is disengaged, i.e., during slip in clutch pack 52, to drive rotation of output shaft 26. This mode of operation is analogous to using motor 22 to provide power to the vehicle wheels through output shaft 26 and the vehicle transmission, independent of the power supplied by the vehicle engine.

In another mode of operation, the torque provided by motor 22 is applied while clutch 23 is engaged, as described above in the first situation, where torque is flowing from input shaft 24, through clutch pack 52, to output shaft 26. This mode of operation is analogous to using the torque produced by motor 22 to supplement the torque provided by the vehicle engine.

In still another mode of operation, the torque provided by motor 22 is applied while clutch 23 is engaged, as described above in the second situation, where the torque is flowing from output shaft 26, through clutch pack 52, to input shaft 24. This mode of operation is analogous to using motor 22 as a starter for rotationally driving input shaft 24 to crank or start the vehicle engine. Additionally, the torque provided by motor 22 can be used to synchronize the engine to facilitate a downshift of the vehicle transmission.

In still another mode of operation, motor 22 can be operated as a generator to convert the mechanical input of rotating clutch outer hub 35 into electrical energy. In a first sub-mode of operation, the torque provided to motor 22 is applied while clutch 23 is engaged and torque is flowing from input shaft 24 through to output shaft 26, as described above in the first situation. This mode of operation is analogous to operating the engine with the transmission in neutral to recharge the electric power source. In a second sub-mode of operation, the torque provided to motor 22 is applied while clutch 23 is engaged and torque is flowing from output shaft 26 through to input shaft 24, as described above in the first situation. This mode of operation is analogous to a vehicle that is under engine braking, and motor 22 is being used to supplement the braking power of the engine and simultaneously recharge the electrical power source or otherwise dissipate the generated electric energy. This mode of operation is also analogous to using motor 22 to take energy out of the system to facilitate an upshift of the vehicle transmission. In a third sub-mode of operation, motor 22 can be operated as a generator while clutch 23 is disengaged for the sole purpose of regenerative braking.

Although the integrated motor and clutch assembly of the present invention is described as employing an electromagnetically actuated friction clutch, it is not intended to be limited thereto. Alternatively, assembly 20 may include other types of clutches for transferring torque between an input shaft and an output shaft, including, but not limited to, a manually, pneumatically or hydraulically actuated friction clutch.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. An integrated motor and clutch assembly comprising:
a housing that supports an input shaft and an output shaft for rotation therein;
a selectively engageable friction clutch disposed between the input shaft and the output shaft for transferring torque therebetween, the friction clutch including an outer hub attached to the output shaft; and
a motor comprising a rotor connected to the outer hub of the friction clutch and disposed coaxial with the input and output shafts, and a stator secured to the housing and disposed concentric with the rotor.

2. The assembly of claim 1, wherein the friction clutch is electromagnetically engaged.

3. The assembly of claim 1, wherein the friction clutch includes a clutch pack for frictionally and rotatably connecting the input and the output shafts and a ball ramp mechanism for loading the clutch pack, whereby the load on the clutch pack is maintained regardless of the direction of torque flow through the integrated motor and clutch assembly.

4. The assembly of claim 3, wherein the ball ramp mechanism includes:
an annular control plate having an axis of rotation, the control plate including a plurality of circumferential control ramps formed in a face of the control plate, the control ramps varying in axial depth;
an equivalent number of rolling elements one occupying each of the control ramps; and
an activation place having an axis of rotation coaxial with the axis of rotation of the control plate, the activation plate having a plurality of activation ramps that at least partially oppose the control ramps, such that each of the rolling elements is contained between one of the activation ramps and a respective control ramp.

5. The assembly of claim 4, wherein the control plate is connected to a control extension and the activation plate is connected to an activation extension.

6. The assembly of claim 5, wherein the control extension includes a plurality of circumferentially extending regions of low magnetic permeability.

7. The assembly of claim 5, wherein the activation extension includes a plurality of circumferentially extending regions of low magnetic permeability.

8. The assembly of claim 5, wherein the friction clutch further includes an annular intermediate plate nonrotatably connected to the output shaft and disposed between the control extension and the activation extension.

9. The assembly of claim 8, wherein the intermediate plate includes a plurality of circumferentially extending regions of low magnetic permeability.

10. The assembly of claim 8, wherein the friction clutch further includes a coil for creating an electromagnetic field in a coil armature upon introduction of an electrical current in the coil, wherein the coil armature is mounted to the input shaft through a second one-way clutch.

11. The assembly of claim 10, wherein upon introduction of an electrical current in the coil, an electromagnetic field is generated to rotationally couple the coil armature to the control extension and the control extension to the intermediate plate and the intermediate plate to the activation extension.

12. The assembly of claim 10, wherein the coil armature includes a plurality of circumferentially extending regions of low magnetic permeability.

13. The assembly of claim 3, further comprising a drive hub nonrotatably connected to the clutch pack and to the input shaft.

14. The assembly of claim 4, further comprising a first thrust bearing interposed between the clutch outer hub and the input shaft and a second thrust bearing interposed between the control plate and the output shaft.

15. The assembly of claim 1, further including an oil pump driven by the input shaft for providing oil to the integrated motor and clutch assembly.

16. The assembly of claim 15, further including a shaft cavity formed in the output shaft for distributing the oil to at least one of the friction clutch and the motor.

17. The assembly of claim 1, wherein the motor can operate as a motor and a generator.

18. An integrated motor and clutch assembly comprising:
a housing that supports an input shaft and an output shaft for rotation therein;
a selectively engageable clutch disposed between the input shaft and the output shaft for transferring torque therebetween, the clutch comprising a ball ramp mechanism for generating a clamping force comprising; an annular control plate having an axis of rotation, the control plate having a plurality of circumferential control ramps formed in a face of the control plate, the control ramps varying in axial depth, an equivalent number of rolling elements one occupying each of the control ramps, an activation plate mounted to the output shaft through a first one-way clutch having an axis of rotation coaxial with the axis of rotation of the control plate, the activation plate having a plurality of activation ramps substantially identical in number, shape and radial position to the control ramps where the activation ramps at least partially oppose the control ramps and where each of the rolling elements is contained between one of the activation ramps and a respective control ramp, the control plate being axially and rotationally moveably disposed relative to the activation plate, the control plate having an annular control extension radially extending therefrom and the activation plate having an annular activation extension radially extending therefrom, an annular intermediate plate nonrotatably connected to the output shaft and disposed between the control extension and the activation extension; a coil for creating an electromagnetic field in a coil armature upon introduction of an electrical current in the coil where the coil armature is mounted to the input shaft through a second one-way clutch; a clutch pack for frictionally and rotatably connecting the input shaft to the output shaft upon application of the clamp load generated by the ball ramp mechanism; wherein upon introduction of an electrical current in the coil an electromagnetic field is generated to rotationally couple the coil armature to the control extension and the control extension to the intermediate plate and the intermediate plate to the activation extension; and
a motor comprising a rotor connected to the outer hub of the clutch and disposed coaxial with the input and output shafts, and a stator secured to the housing and disposed concentric with the rotor.

19. An integrated motor and clutch assembly comprising:
a housing that supports an input shaft and an output shaft for rotation therein;
a selectively engageable friction clutch disposed between the input shaft and the output shaft for transferring torque therebetween, the friction clutch including an outer hub connected for rotation with the output shaft;

a motor comprising a rotor connected to the outer hub of the friction clutch and disposed coaxial with the input and output shafts, and a stator secured to the housing and disposed concentric with the rotor; and wherein the friction clutch includes a clutch pack for frictionally and rotatably connecting the input and the output shafts and a ball ramp mechanism for loading the clutch pack, whereby the load on the clutch pack is maintained regardless of the direction of torque flow through the integrated motor and clutch assembly, the ball ramp mechanism including an annular control plate having an axis of rotation, the control plate including a plurality of circumferential control ramps formed in a face of the control plate, the control ramps varying in axial depth; an equivalent number of rolling elements one occupying each of the control ramps; an activation plate having an axis of rotation coaxial with the axis of rotation of the control plate, the activation plate having a plurality of activation ramps that at least partially oppose the control ramps, such that each of the rolling elements is contained between one of the activation ramps and a respective control ramp, the control plate being connected to a control extension and the activation plate is connected to an activation extension; and at least one slip joint interposed between the control plate and the control extension to nonrotatably couple the control plate to the control extension while allowing relative axial movement between the control plate and the control extension.

20. An integrated motor and clutch assembly comprising:

a housing that supports an input shaft and an output shaft for rotation therein;

a selectively engageable friction clutch disposed between the input shaft and the output shaft for transferring torque therebetween, the friction clutch including an outer hub connected for rotation with the output shaft;

a motor comprising a rotor connected to the outer hub of the friction clutch and disposed coaxial with the input and output shafts, and a stator secured to the housing and disposed concentric with the rotor; and wherein the friction clutch includes a clutch pack for frictionally and rotatably connecting the input and the output shafts and a ball ramp mechanism for loading the clutch pack, whereby the load on the clutch pack is maintained regardless of the direction of torque flow through the integrated motor and clutch assembly, the ball ramp mechanism including an annular control plate having an axis of rotation, the control plate including a plurality of circumferential control ramps formed in a face of the control plate, the control ramps varying in axial depth; an equivalent number of rolling elements one occupying each of the control ramps; an activation plate having an axis of rotation coaxial with the axis of rotation of the control plate, the activation plate having a plurality of activation ramps that at least partially oppose the control ramps, such that each of the rolling elements is contained between one of the activation ramps and a respective control ramp, the control plate being connected to a control extension and the activation plate is connected to an activation extension; and at least one slip joint interposed between the activation plate and the activation extension to nonrotatably couple the activation plate to the activation extension while allowing relative axial movement between the activation plate and the activation extension.

21. The assembly of claim 1, wherein the motor is selectively operable to drive rotation of the output shaft independent of the torque provided by the input shaft when the clutch is disengaged.

* * * * *

UNITED STATES PATENT AND TRADEMARK OFFICE
CERTIFICATE OF CORRECTION

PATENT NO. : 6,888,273 B2
DATED : May 3, 2005
INVENTOR(S) : Douglas A. Hughes et al.

It is certified that error appears in the above-identified patent and that said Letters Patent is hereby corrected as shown below:

<u>Column 10,</u>
Line 42, replace "," after "therefrom" with -- ; --.

Signed and Sealed this

Twelfth Day of July, 2005

JON W. DUDAS
*Director of the United States Patent and Trademark Office*